(12) United States Patent
Jung et al.

(10) Patent No.: US 11,785,601 B2
(45) Date of Patent: *Oct. 10, 2023

(54) METHOD AND APPARATUS FOR DECODING CONTROL INFORMATION IN WIRELESS COMMUNICATION SYSTEM

(71) Applicant: Samsung Electronics Co., Ltd., Gyeonggi-do (KR)

(72) Inventors: Euichang Jung, Seoul (KR); Suyoung Park, Gyeonggi-do (KR); Suha Yoon, Gyeonggi-do (KR); Sunghyuk Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/871,304

(22) Filed: Jul. 22, 2022

(65) Prior Publication Data

US 2022/0361163 A1    Nov. 10, 2022

Related U.S. Application Data

(63) Continuation of application No. 16/647,292, filed as application No. PCT/KR2018/011530 on Sep. 28, 2018, now Pat. No. 11,425,694.

(30) Foreign Application Priority Data

Sep. 29, 2017    (KR) .......................... 10-2017-0128170

(51) Int. Cl.
*H04W 72/20*    (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS

| 11,190,298 B2 | 11/2021 | Zhu |
| 11,425,694 B2 * | 8/2022 | Jung ..................... H04W 72/23 |
| 2011/0286292 A1 | 11/2011 | Lucero |

(Continued)

FOREIGN PATENT DOCUMENTS

| WO | WO 2013/069903 | 5/2013 |
| WO | WO 2017/160100 | 9/2017 |

OTHER PUBLICATIONS

PCT/ISA/210 Search Report issued on PCT/KR2018/011530, pp. 5.

(Continued)

*Primary Examiner* — Nguyen H Ngo
(74) *Attorney, Agent, or Firm* — The Farrell Law Firm, P.C.

(57) ABSTRACT

Disclosed is a 5G or pre-5G communication system for supporting a data transmission rate higher than that of a 4G communication system such as LTE. According to an embodiment of the present invention, a method for a terminal in a wireless communication system comprises: receiving system information and radio resource control (RRC) configuration information; identifying decoding-related information including an aggregation level based on the system information and/or the RRC configuration information; and decoding control information on the basis of the aggregation level.

10 Claims, 12 Drawing Sheets

(56) References Cited

U.S. PATENT DOCUMENTS

| | | | |
|---|---|---|---|
| 2015/0016385 | A1 | 1/2015 | Aiba |
| 2015/0103715 | A1 | 4/2015 | Chen |
| 2017/0055242 | A1 | 2/2017 | Kusashima |
| 2017/0134880 | A1 | 5/2017 | Rico Alvarino |
| 2018/0048448 | A1* | 2/2018 | Zhang .................. H04W 24/10 |
| 2018/0262398 | A1* | 9/2018 | Chen .................. H04W 72/044 |
| 2018/0375628 | A1* | 12/2018 | Lee ...................... H04W 72/20 |
| 2019/0037540 | A1 | 3/2019 | Seo et al. |
| 2019/0159230 | A1* | 5/2019 | Kim ...................... H04W 72/23 |
| 2020/0374094 | A1 | 11/2020 | Pelletier |

OTHER PUBLICATIONS

PCT/ISA/237 Written Opinion issued on PCT/KR2018/011530, pp. 6.

Vivo, Samsung, "WF on NR PDCCH Blind decodes", 3GPP TSG RAN WG1 NR Ad-Hoc#2, R1-1711754, Qingdao, P.R. China, Jun. 27-30, 2017, pp. 2.

Mediatek, OPPO, Nokia, Nokia Shanghai Bell, Qualcomm, "Way Forward on NR-PDCCH Blind Decoding", 3GPP TSG-RAN WG1 #90, R1-1714804, Prague, Czech Republic, Aug. 21-25, 2017, pp. 2.

Nokia, Nokia Shanghai Bell, "On the PDCCH control resource set and its connection to the search space for NR", 3GPP TSG RAN WG1 #90, R1-1714059, Prague, Czech Republic, Aug. 11, 2017, pp. 7.

Huawei, HiSilicon, "CORESET configuration and search space design", 3GPP TSG RAN WG1 Meeting AH_NR#3, R1-1715395, Nagoya, Japan, Sep. 11, 2017, pp. 12.

MediaTek Inc., "Discussions on search space and CORESET designs", 3GPP TSG RAN WG1 Meeting AH_NR#3, R1-1716198, Nagoya, Japan, Sep. 12, 2017, pp. 12.

Panasonic, "Configuration of CORESET and search space design", 3GPP TSG RAN WG1 Meeting NR-AH#3, R1-1716542, Nagoya, Japan, Sep. 11, 2017, pp. 9.

Ericsson, "On Configuration of Control Resource Sets and Search Space", 3GPP TSG RAN1 WG1 Meeting NR#3, R1-1716578, Nagoya, Japan, Sep. 12, 2017, pp. 12.

Xiaomi, "Discussion on the CORESET Configuration", R1-1716564, 3GPP TSG RAN WG1 Meeting NR#3, Sep. 18-21, 2017, 3 pages.

Korean Office Action dated Jun. 8, 2021 issued In counterpart application No. 10-2017-0128170, 10 pages.

ZTE, "NR-PDCCH for Supporting URLLC", R1-1712447, 3GPP TSG RAN WG1 Meeting #90, Aug. 21-25, 2017, 7 pages.

Korean Office Action dated Dec. 21, 2021 issued in counterpart application No. 10-2017-0128170, 8 pages.

NTT DOCOMO, Inc., "Search Space Design for NR-PDCCH", R1-1716094, 3GPP TSG RAN WG1 Meeting NR#3, Sep. 18-21, 2017, 11 pages.

Korean Office Action dated Jun. 10, 2022 issued in counterpart application No. 10-2017-0128170, 7 pages.

Korean Office Action dated Nov. 3, 2022 issued in counterpart application No. 10-2022-0131760, 8 pages.

Korean Office Action dated May 10, 2023 issued in counterpart application No. 10-2022-0131760, 9 pages.

* cited by examiner

METHOD AND APPARATUS FOR DECODING CONTROL INFORMATION IN WIRELESS COMMUNICATION SYSTEM

PRIORITY

This application is a Continuation Application of U.S. patent application Ser. No. 16/647,292 filed Mar. 13, 2020 as a National Phase Entry of PCT International Application No. PCT/KR2018/011530 filed on Sep. 28, 2018, and claims priority to Korean Patent Application No. 10-2017-0128170 filed on Sep. 29, 2017, the content of each of which is incorporated herein by reference.

BACKGROUND

1. Field

The disclosure relates generally to a wireless communication system and, in particular, to a method and apparatus for decoding control information in the wireless communication system.

2. Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the frame structure introduced for use in the 5G system involves the necessity of newly defining a resource set for transmitting control information. Therefore, there is therefore a need of a method for decoding the control information efficiently.

The disclosure has been proposed to solve the above problem and aims to provide a method and apparatus for decoding control information efficiently.

SUMMARY

The disclosure has been made to address at least the above-mentioned problems and/or disadvantages and to provide at least the advantages described below.

An aspect of the disclosure provides a method performed by a user equipment (UE) in a communication system, including receiving, from a base station, configuration information including first information indicating a first aggregation level of a common search space (CSS) corresponding to a first control resource set (CORESET) and second information indicating a second aggregation level of a UE-specific search space (USS) corresponding to a second CORESET; obtaining common control information by monitoring the first CORESET according to a first monitoring periodicity; and obtaining control information for the UE by monitoring the second CORESET according to a second monitoring periodicity, with the first monitoring periodicity is determined based on the first aggregation level of the CSS, and the second monitoring periodicity is determined based on the second aggregation level of the USS.

Another aspect of the disclosure provides a user equipment (UE) in a communication system, the UE including a transceiver and a controller, which is configured to receive, from a base station via the transceiver, configuration information including first information indicating a first aggregation level of a CSS corresponding to a first CORESET and second information indicating a second aggregation level of a USS corresponding to a second CORESET, obtain common control information by monitoring the first CORESET according to a first monitoring periodicity, and obtain control information for the UE by monitoring the second CORESET according to a second monitoring periodicity, with the first monitoring periodicity being determined based on the first aggregation level of the CSS, and wherein the second monitoring periodicity being determined based on the second aggregation level of the USS.

The method and apparatus according to various disclosed embodiments are advantageous in terms of mitigating overhead and decoding control information efficiently by reducing a per-terminal configuration information amount.

BRIEF DESCRIPTION OF DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
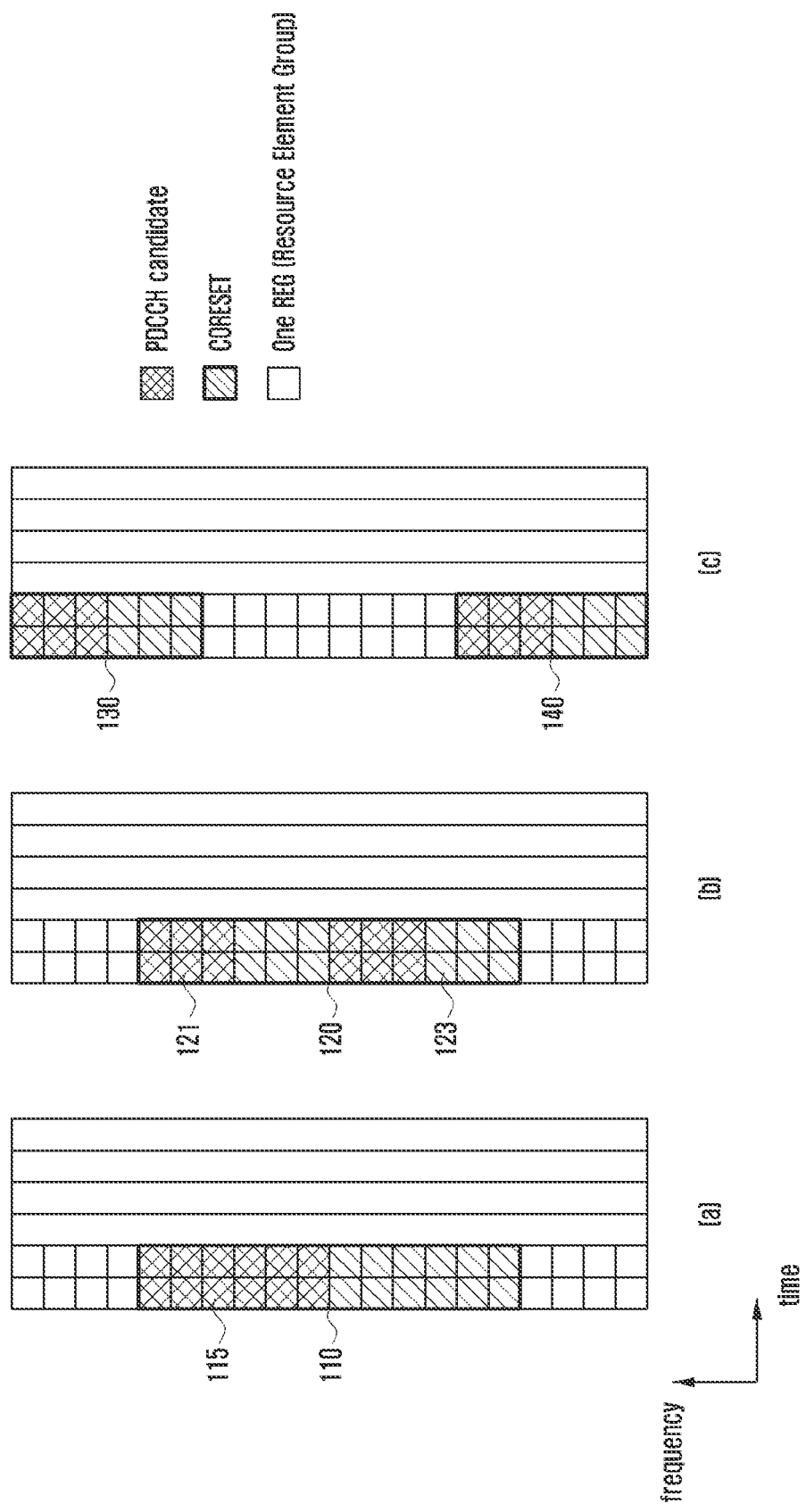
FIG. 1 is a diagram illustrating a frame structure for a 5G communication system.

Exemplary embodiments of the disclosure are described in detail with reference to the accompanying drawings. Detailed descriptions of well-known functions and structures incorporated herein may be omitted to avoid obscuring the subject matter of the disclosure. Further, the following terms are defined in consideration of the functionality requirements in the disclosure, and they may vary according to the intention of a user or an operator, usage, etc. Therefore, the definition should be made on the basis of the overall content of the present specification.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

In 5G, the concept of CORESET(s) was introduced for slot-based scheduling. CORESET is a set of control resources (control resource set (CORESET)); in the disclosure, the terms "control resource set" and "CORESET" are interchangeably used. The 5G (NR) system adopts blind decoding to detect PDCCH as in LTE. In the legacy LTE, a frequency domain resource region available for carrying a physical downlink control channel (PDCCH) is limited by a system bandwidth (BW), and a time domain resource region may be identified by a number of symbols indicated by a physical control format indicator channel (PCFICH). The corresponding PDCCH region may be divided into a common search space and a UE-specific search space.

Meanwhile, four aggregation levels 1, 2, 4, and 8 are defined for LTE systems. In the 5G communication system, it is necessary to design an optimal resources structure and signaling in consideration of newly added aggregation levels 16 and 32 that are not supported in the LTE system. However, the proposed method is not limited to the disclosed embodiments and may be applied to a 5G communication system supporting other aggregation levels (e.g., aggregation level 64). In the case of considering such additional aggregation levels, it is necessary to manage resources in collective consideration of the structures of the common search space and the UE-specific search space as well as the aggregation levels. This aims to complete a design for meeting design requirements, such as a number of maximum blind decoding attempts (e.g., 44) to relieve the burden in that all UEs have to attempt decoding with the additional aggregation levels 16 and 32. In particular, if the slot-level CORESET and symbol-level CORESET are assigned in one component carrier (CC) or one bandwidth part (BWP), this inevitably increases the number of blind decoding attempts, which increases further in consideration of multiple PDCCHs supporting beamforming, and leads to a need of a method for solving such a problem.

FIG. 1 is a diagram illustrating a frame structure for a 5G communication system.

Descriptions are made of the designs of CORESETs and PDCCH candidates and various scenarios for use in the 5G communication system with reference to FIG. 1.

A CORESET structure may be configured as shown in FIG. 1. As described above, the CORESET is a set of resources for transmitting control information; there are two types of CORESETs: a common CORESET for transmitting common control information and a UE-specific CORESET for transmitting UE-specific control information. The common and UE-specific CORESETs may be included in one CORESET and or separately configured with different resources. In the disclosure, the common and UE-specific CORESETs may be referred to as first CORESET and second CORESET, respectively.

In detail, as shown in part (a) of FIG. 1, a CORESET 110 may include a PDCCH candidate 115. For example, the CORESET 110 may be a common CORESET or a UE-specific CORESET and may include a common search space or a UE-specific search space.

As shown in part (b) of FIG. 1, a CORESET 120 may include multiple PDCCH candidates 121 and 123. For example, the CORESET 120 may include both common and UE-specific search spaces, only multiple common search spaces, or only multiple UE-specific search spaces.

As shown in part (c) of FIG. 1, multiple CORESETs 130 and 140 are separately configured with respective resources. For example, the CORESET 130 may be configured as a common CORESET including a common search space 135, and the CORESET 140 may be configured as a UE-specific CORESET including a UE-specific search space 145.

The CORESET may be configured with a periodicity in order for a UE to monitor the CORESET. A detailed description thereof is made later. Descriptions are made hereinafter of the characteristics of common and UE-specific CORESETs.

Common CORESET: A common CORESET means a frequency-time resource region including a common search space. The common CORESET may include a UE-specific search space according to circumstances. An interval of a common CORESET or an interval of common CORESET monitoring of a UE may be configured via radio resource control (RRC) signaling or set to a default value.

UE-specific CORESET: A UE-specific CORESET means a frequency-time region including a UE-specific search space. Multiple UE-specific CORESETs may be configured in a slot, and an interval of a UE-specific CORESET may be configured so as to be different from that of the common CORESET. As well as such slot-level CORESETs, one or more symbol-level CORESETs may be configured.

A UE may acquire control information by performing blind decoding in a search space of the common or UE-specific CORESET. Here, the UE may perform blind decoding based on an aggregation level; a description is made in detail hereinafter of the blind decoding.

Figure 2:
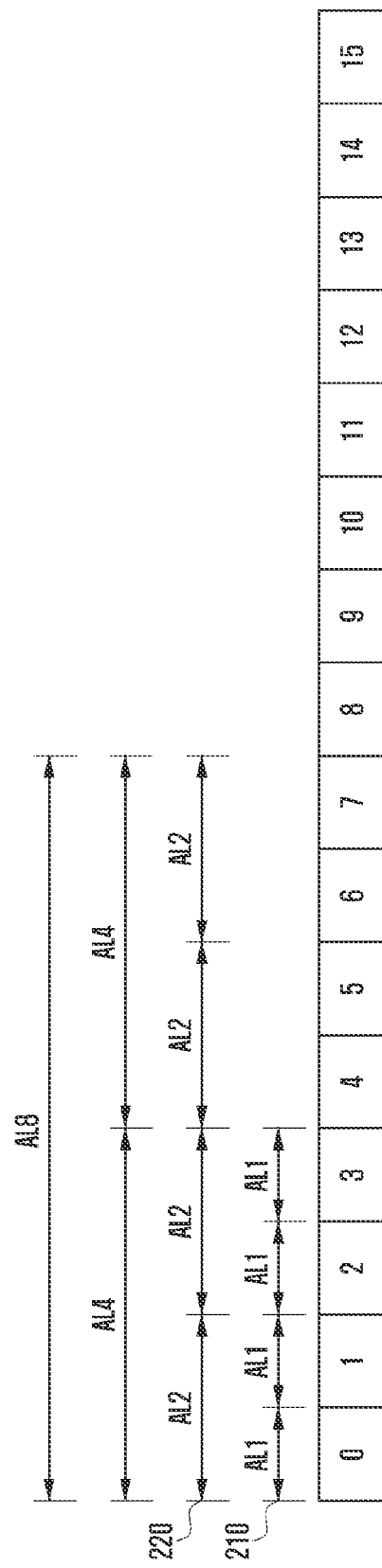
FIG. 2 is a diagram for explaining concepts of search space and aggregation according to a disclosed embodiment.

FIG. 2 is a diagram for explaining concepts of search space and aggregation according to a disclosed embodiment.

In the LTE system, four resource elements (REs) are grouped to form a resource element group (REG), and nine REGs constitute a control channel element (CCE); control resources are assigned by a unit of CCEs.

Meanwhile, in the 5G communication system, twelve REs are grouped to form a physical resource block (PRB) (1 PRB=12 REs), and one PRB may be equal to one REG (1 REG=1 PRB). One CCE may consist of 6 REGs (1 CCE=6 REGs). Among the 12 REs, DMRS is mapped at a density of ¼ such that the base station can actually only 9 REs, considering the basic MCS of QPSK.

The base station may transmit control information using a CCE or a group of consecutive CCEs, and the UE may search the CCE or group of consecutive CCEs for the control information. Here, the number of CCEs in use for transmitting the control information or a unit of CCEs for the UE to search for the control information may be referred to as an aggregation level.

Accordingly, the UE may arrange the REs to which the control channel is mapped by a CCE and perform blind decoding to acquire the control signal according to the aggregation level.

In reference to FIG. 2, the UE may perform blind decoding of the control information at aggregation levels 1, 2, 4, and 8.

For example, at aggregation level 1 as denoted by reference number 210, the UE may attempt decoding of the control information, increasing the CCE index by 1 from 0.

At aggregation level 2 as denoted by reference number 220, the UE may attempt decoding of the control information by a unit of 2 CCEs. That is, the UE may perform decoding for CCE indices 0 and 1 and then CCE indices 2 and 3.

Here, the CCE(s) on which the UE attempts decoding is referred to as search space.

For the common search space, the aggregation level (AL) for a UE to decode control information is set to a default value. Here, the default value is set for the UE to perform decoding a predetermined number of times without any separate indication or configuration. For example, for the common search space, the default AL may be set to 4 or 8 (AL=4, 8). In this case, the UE may decode the control signal under the assumption of the search space provided with AL=4, 8. However, the proposed method is not limited to the disclosed embodiment and may be implemented in such a way that the base station configures an AL value for the common search space to the UE separately.

Configuring a default AL value for a UE to decode control information in a UE-specific search space may be supported or not. In the case where configuring a default AL value is not supported, the AL value may be configured by the base station.

In an embodiment, the ALs 1 and 2 may be considered for the UE-specific search space. Although even used in LTE, these AL values may not be identical in meaning between the LTE and 5G systems because of the difference of physical bit-size caused by a difference in CCE structure between the LTE and 5G systems. In an alternative embodiment, ALs 16 and 32 may be considered to be included for the UE-specific search space. The ALs may be designed in consideration of decoding performance improvement of the UE at a cell edge or ultra-reliability for URLLC.

Meanwhile, a DCI format may be configured to include resource information, MCS information, CGB and HARQ information (RV, NDI, HARQ process number, etc.), power control information, multi-antenna information, SRS information, and RNTI information. It may be necessary for DCI to have an appropriate size (length) to be mapped to PDCCH resources. The size may or may not be accurately mapped to the above described AL. If not accurately mapped, all or part of the DCI may be repeated based on a channel condition.

Figure 3:
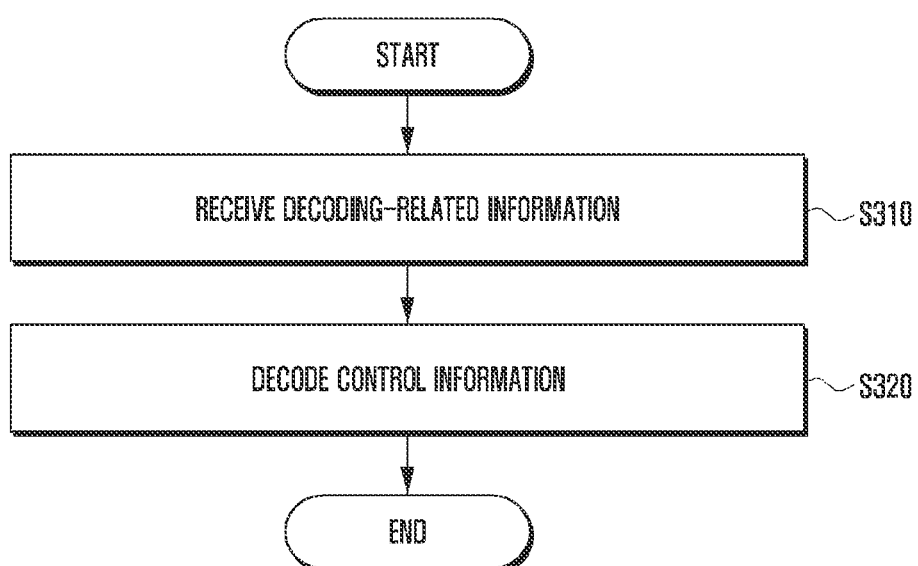
FIG. 3 is a flowchart illustrating a procedure for decoding a control signal according to a disclosed embodiment.

FIG. 3 is a flowchart illustrating a procedure for decoding control signals according to a disclosed embodiment.

In reference to FIG. 3, the UE may receive decoding-related information at step S310. The decoding-related information may include AL information. Here, the AL information may be configured per CORESET. The AL information may be configured per cell. How to determine per-cell AL information is exemplarily described later.

The decoding-related information may include CORESET configuration information. The CORESET configuration information may include at least one of common CORESET location information, common CORESET periodicity information, UE-specific CORESET location information, or UE-specific CORESET periodicity information. However, the CORESET location or periodicity information may be preconfigured and, in this case, the UE may receive no CORESET-related information. In the case where part of the CORESET location or periodicity information is preconfigured, the UE may receive the remaining part of the CORESET-related information.

For example, the common CORESET location information and periodicity information may be predetermined, the UE may receive the UE-specific CORESET location information and periodicity information.

The AL information and CORESET configuration information included in the decoding-related information may be transmitted via separate signaling. For example, the UE may receive the common CORESET configuration information and common CORESET AL information via the MIB or a synchronization signal and the UE-specific CORESET configuration information and AL information via RRC information. The common CORESET configuration information and AL information is configured with a predetermined value, the UE may receive the UE-specific CORESET configuration information via the RRC information and the AL information via system information or RRC information.

However, the proposed method is not limited to the disclosed embodiment and may be implemented in such a way that the AL information and CORESET configuration information are preconfigured or signaled using at least one of the MIB, synchronization information, system information, and RRC information.

Afterward, the UE may decode the control signal at step S320. The UE may decode the control information based on the received decoding-related information.

Figure 4:
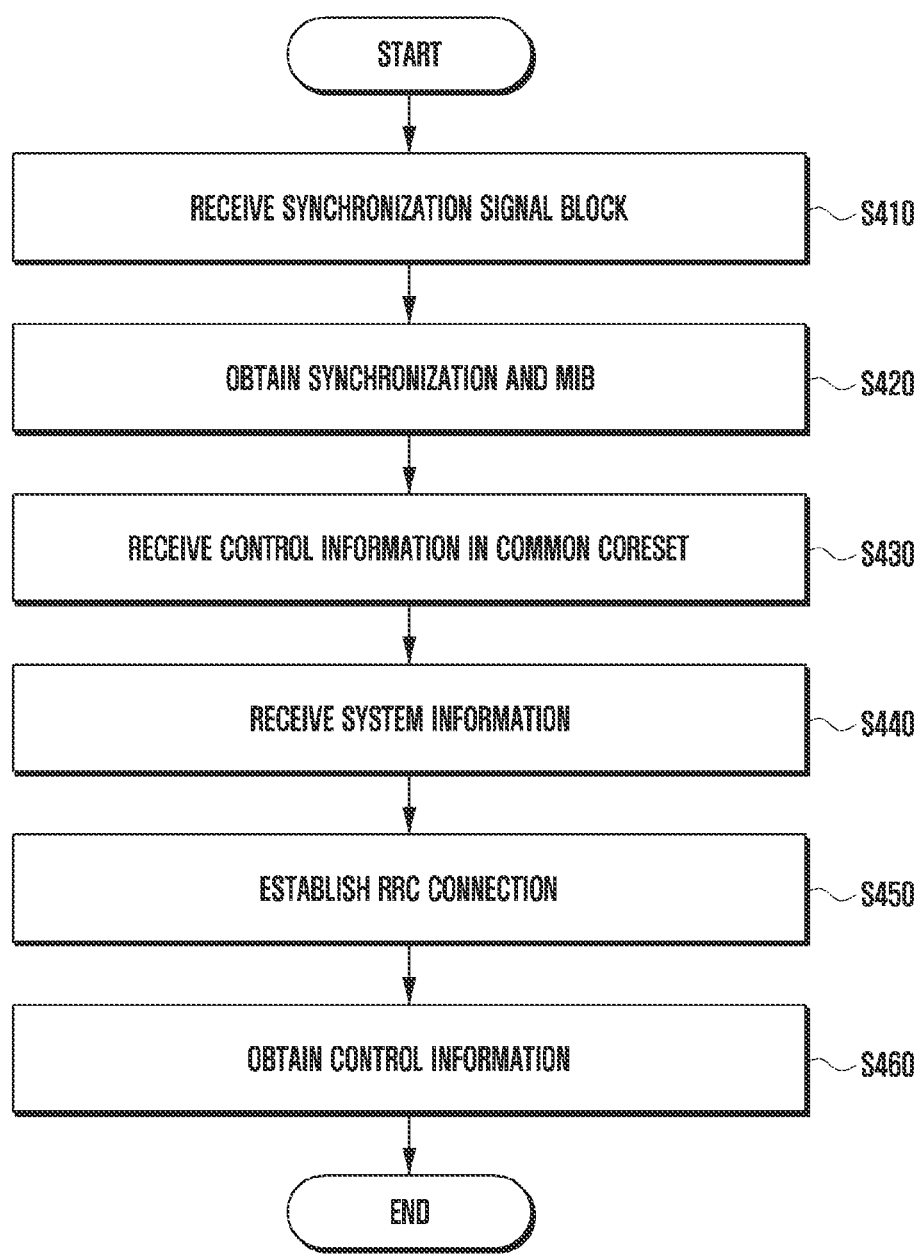
FIG. 4 is a flowchart illustrating a detailed procedure for decoding control information according to a disclosed embodiment.

The above description is elaborated in more detail with reference to FIG. 4.

FIG. 4 is a flowchart illustrating a detailed procedure for decoding control information according to a disclosed embodiment.

At steps S410 and S420 of FIG. 4, the UE may receive the decoding-related information of FIG. 3.

In reference to FIG. 4, the UE may receive a synchronization signal block at step S410. The synchronization signal block has a format arranging a primary synchronization signal (PSS), a physical broadcast channel (PBCH), a secondary synchronization signal (SSS), and a PBCH in order. The synchronization signal block may also be referred to as SS/PBCH block.

At step S420, the UE may acquire synchronization and master block information (MIB). Here, the UE may check the MIB or synchronization signal for location information, periodicity information, and AL information of the common CORESET. The above information may be preconfigured with a default value.

At step S430, the UE may receive common control information via the common CORESET. The UE may search a search space in the common CORESET to decode the common control information. Here, the UE may use the AL information identified via the MIB or synchronization signal or default AL information.

At step S440, the UE may receive system information. The UE may receive the system information based on the common control information received via the common CORESET. For example, the common control information received via the common CORESET may include RNTI information (SI-RNTI) for use in decoding the system information and system information resource location information, which the UE uses for decoding the system information.

The system information may include remaining minimum system information (RMSI), excluding MIB from minimum system information and other SI (OSI).

The system information may include at least one of CORESET configuration information or AL information. According to an embodiment, the information may be transmitted via RRC configuration information and excluded from the system information.

At step S450, the UE may establish an RRC connection. The UE may check the RRC configuration information for at least one of the CORESET configuration information and AL information in an RRC connection establishment procedure. The RRC configuration information may include decoding-related information that is not included in the system information.

At step S460, the UE may acquire control information. The UE may decode the control information being transmitted in a UE-specific search space of the common CORESET or in the UE-specific CORESET. Here, the UE may decode the control information based on the acquired AL information, which may be received via the system information or included in the information received in establishing the RRC connection.

According to a disclosed embodiment, a base station may determine decoding-related information such as per-cell AL information and CORESET-related information and transmit the information to a UE. For example, the decoding-related information may be transmitted via the system information or RRC information. Part of the decoding-related information may be preconfigured with a default value and transmitted to the UE via the MIB or synchronization signal. Accordingly, the UE may decode the control information using the decoding-related information acquired per cell. A detailed description thereof is made hereinafter.

Figure 5:
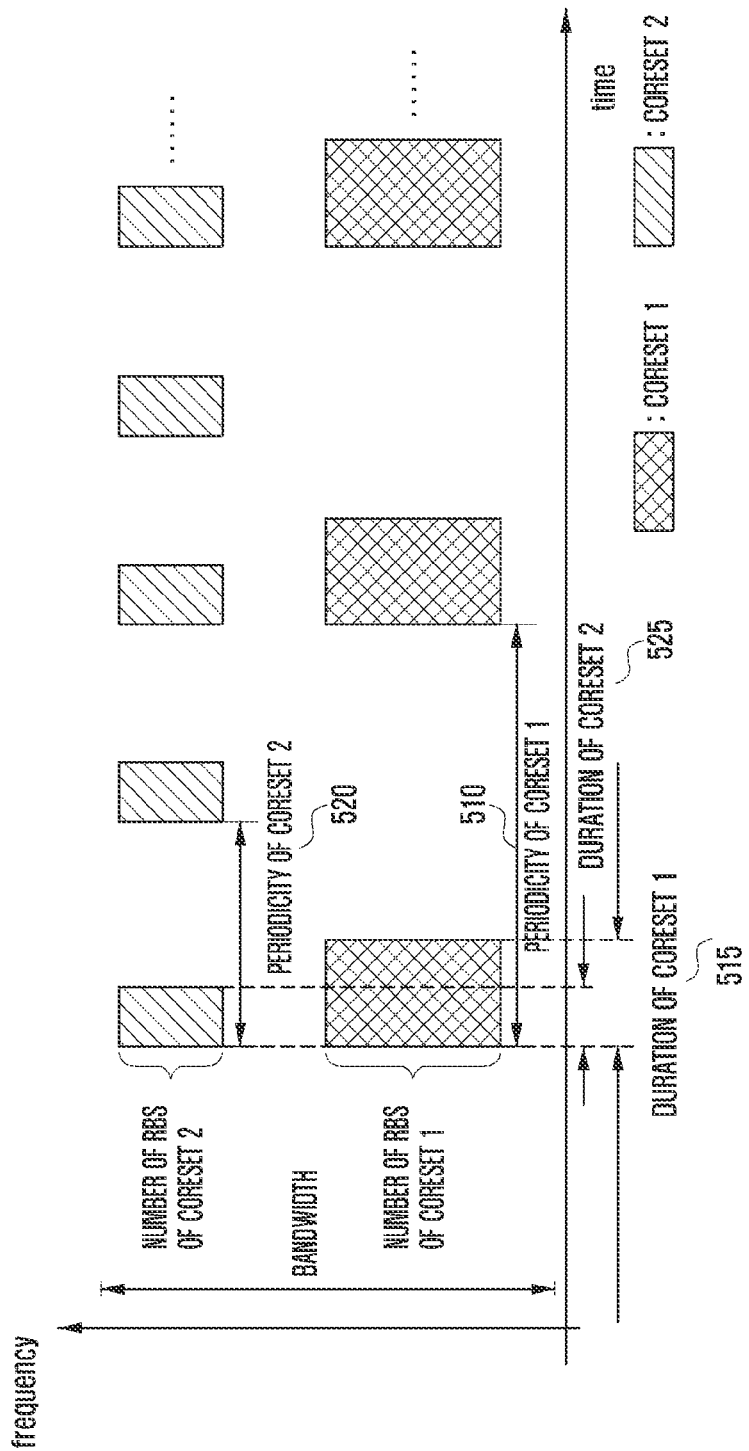
FIG. 5 is a diagram for explaining monitoring periodicity information according to a disclosed embodiment.

FIG. 5 is a diagram for explaining monitoring periodicity information according to a disclosed embodiment.

In the disclosure, the CORESET periodicity information may be referred to as CORESET monitoring periodicity information or monitoring periodicity information.

As described above, the common CORESET periodicity information may be preconfigured with a default value or configured to the UE via the MIB or a synchronization signal. The UE may monitor the CORESET according to the periodicity information to acquire the control information.

The UE-specific CORESET periodicity information may be transmitted to the UE via the RMSI/OSI or higher layer signaling (or RRC signaling). For example, if only one CORESET exists in one slot, the UE may identify a value configured via higher layer signaling.

If an additional CORESET (e.g., UE-specific CORESET) exists or multiple-CORESETs exist as in a scenario being considered in a multibeam scenario, the per-CORESET monitoring periodicity may be configured to be identical or different among the CORESETs. That is, the base station may configure the periodicity per CORESET according to a design and structure of the CORESET. The CORESET may also be configured to include a PDCCH candidate or a set of PDCCH candidates.

In reference to FIG. 5, the per-CORESET periodicities differ in length. The periodicity 510 of CORESET 1 may be configured to be longer than the periodicity 520 of CORESET 2, and the duration 515 of CORESET 1 may be configured to be longer than the duration 525 of CORESET 2. In this manner, different per-CORESET configuration information may be transmitted to the UE.

As described above, the AL information may be configured to the UE per CORESET. In this case, per-CORESET AL values may be set so as not to be overlapped between CORESETs. For example, if the ALs for common CORESETs are set to default values 1 and 2, ALs for other CORESETs may be set to at least one of 1, 2, 16, and 32. As another example, if the ALs for common CORESETs are set to default values 1, 2, 4, and 8, ALs for other CORESETs may be set to at least one of 16 and 32. However, some of the values may be configured to be overlapped.

It may also be possible that the same AL information is configured to the UE for a set of CORESETs.

In the 5G communication system, a per-cell service provision scenario is considered, and the service provided by a cell or the cell coverage determines per-cell decoding-related information. A description thereof is made hereinafter.

Figure 6:
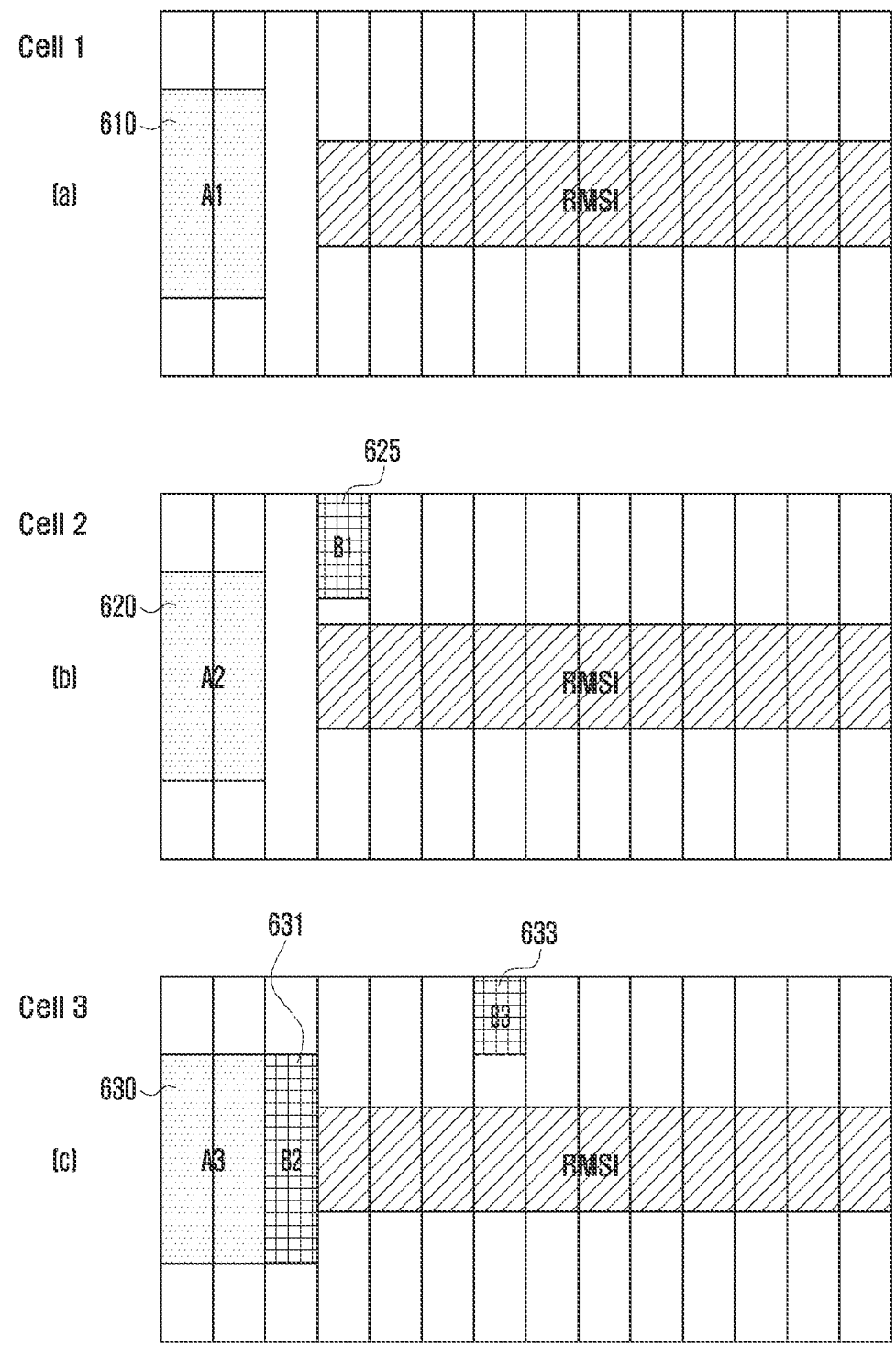
FIG. 6 is a diagram illustrating how to determine per-cell AL information according to an disclosed embodiment.

FIG. 6 is a diagram illustrating how to determine per-cell AL information according to an disclosed embodiment.

In reference to part (a) of FIG. 6, a A1 CORESET may include a common search space (CSS) and part or all of a UE-specific search space (USS). Here, cell 1 is configured with a common CORESET structure (A1 610), and both the CCS and USS may be included in one CORESET. In this case, ALs may be combined as shown in Table 1. The proposed AL combinations are not limited to the exemplary ones shown in the table below and may be extended to a similar concept. That is, the ALs of the common and UE-specific CORESETs may be mapped to type A and type B CORESETs as shown in Table 1. However, the AL combinations shown in the table below are just exemplary, and the scope of the disclosure is not limited thereto. That is, other various AL combinations may be used as well as the combinations disclosed in Table 1.

TABLE 1

| Cell | type index | AL combination 1 (Non-Overlapping) | AL combination 2 (Non-overlapping) | AL combination 3 (Non-overlapping) | AL combination 4 (Overlapping) |
|---|---|---|---|---|---|
| 1 | A1 | 1, 2, 4, 8 | 1, 2, 4, 8, 16, 32 | 4, 8, 16, 32 | |
| 2 | A2 | 4, 8 | 1, 2, 4, 8 | 1, 2, 8 | 1, 2, 4, 8 |
|   | B1 | 1, 2, 16, 32 | 16, 32 | 4, 16, 32 | 4, 8, 16, 32 |
| 3 | A3 | 4, 8 | 1, 2, 4, 8 | 1, 2, 8 | 1, 2, 4, 8 |
|   | B2 | 1, 2 | 16 | 4, 16 | 16, 32 |
|   | B3 | 16, 32 | 32 | 32 | [1, 2, 4] 16, 32 |

According to an embodiment, A1 (610) may be configured in cell 1 as a common CORESET for supporting all aggregation levels.

Here, AL 16 or 32 may be supported or may not be supported depending on the services (eMBB, UR, URLLC, mMTC, etc.) being supported per cell. In the case where a link budget of an NR cell is bad according to a cell radius, it may be possible to support AL 16 or 32.

There may be various additional embodiments of supporting AL 16 or 32 for supporting cell-specific configuration.

Parts (b) and (c) of FIG. 6 show the cases of configuring common and UE-specific CORESETs with separate resources.

In reference to part (b) of FIG. 6, a A2 (620) may be configured in cell 2 as a common CORESET to support some ALs.

Here, ALs for the A2 (620) may be configured to support 4 and 8. This may be preconfigured as a default or configured to the UE via the MIB or synchronization signal and applied to the CSS in consideration of a universal DCI size. It may also be possible to design such that the remaining ALs 1, 2, 16, or 32 are used for decoding in the UE-specific CORESET resources (B1, 625). However, the proposed method is not limited to the disclosed embodiment and may be implemented in such a way of using A2 and B1 as UE-specific CORESETs. That is, it may be possible to configure the UE to support only ALs 4 and 8 for A2 via RMS/OSI RRC signaling such that the remaining ALs 1, 2, 16, or 32 are used for decoding in other UE-specific CORESET resources. In this case, the AL may be set to a default value so as to be overlapped with the AL value of the UE-specific CORESET.

If ALs 4 and 8 are used in A2 (e.g., CSS)(620) as in combination 2, ALs 1, 2, 16, or 32 may be supported in B1 625 (e.g., USS). In this manner, the base station may design the search spaces to have different AL values. There can be various AL combinations, and Table 1 shows exemplary combinations.

In reference to part (c) of FIG. 6, a A3 may be configured as a common CORESET to support some aggregation levels in cell 3 630.

In this case, ALs for the A2 may be configured to support 1, 2, 4, and 8. This may be preconfigured as a default or configured to the UE via the MIB or synchronization signal and applied to the CSS in consideration of a universal DCI size. However, the proposed method is not limited to the disclosed embodiment and may be implemented in such a way of identifying the A2 with a UE-specific CORESET. In this case, the AL values for the A2 may be configured to the UE via the RMSI/OSI or RRC signaling.

If ALs 1, 2, 4, and 8 are used for A3 630 (e.g., CSS) as in combination 2, AL 16 may be supported in B2 631 (e.g., USS), and AL 32 may be supported in B3 633. In this manner, the individual search spaces may be designed to have different ALs. There can be various AL combinations, and Table 1 shows exemplary combinations.

If ALs 1, 2, 4, and 8 are used for A3 (e.g., CSS), ALs 16 and 32 may be supported in B2 (e.g., USS). In this case, a B3 may be designed such that some or all of the ALs are overlapped. Although ALs 16 and 32 of the B3 are overlapped with all ALs of the B2 CORESET in combination 4, some of the ALs of the B3 may be overlapped with some of the B2 or, in addition, with some of the ALs of A1 (CSS). In a beamforming scenario, individual TRPs may each transmit a PDCCH such that a UE performs decoding in multiple CORESETs. In this case, the ALs of the B3 may include part or all of the ALs of the B2 (USS) and, in addition, the ALs of the CSS.

The ALs 1, 2, 16, and 32 may be or may not be supported according to the services (eMBB, UR, URLLC, mMTC, etc.) being supported per cell. In the case where a link budget of an NR cell is bad according to a cell radius, it may be possible to support AL 16 or 32.

Here, the B2 and B3 are proposed to reduce unnecessary decoding attempts of the UE within one slot in consideration of the agreement made to limit the maximum number of decoding attempts to less than 44 that is the case in LTE and, as described above, a method for configuring ALs per CORESET per cell is proposed (UE-specific configuration is also possible).

The proposed method is capable of reducing the number of decoding attempts of a UE by configuring ALs appropriate for CORESETs per cell in consideration of the services and coverage capacity supported in a cell and configuring per-CORESET monitoring periodicities.

Hereinafter, a description is made of a method for signaling the above-described information. In the disclosed embodiments, the information determined per cell as described above may be transmitted to a UE via UE-specific signaling or broadcast information.

In order to transmit the AL information with the per-cell decoding-related information (cell-specific configuration), it may be possible to use a broadcast or multicast signal (channel).

In detail, a UE may perform decoding common control information in a common CORESET for which a default AL (e.g., 4 or 8) is preconfigured in an initial procedure or AL values are configured through the MIB or synchronization signal as described above. Then, the UE may receive RMSI or OSI based on the common control information. It may be possible to include the AL information associated with s UE-specific CORESET or a UE-specific search space of a common CORESET in the RMSI or OSI. In this case, the UE may perform PDCCH decoding based on max AL information being supported in the corresponding cell. A description thereof is made in detail with an example hereinafter.

1. Common CORESET Including all UE-Specific Search Space

In an embodiment, a UE attempting to access/attach to cell 1 may decode common control information with ALs (e.g., 1, 2, 4, and 8) preconfigured as default values before being RRC-connected or ALs up to a maximum AL (e.g., 8) in the corresponding CORESET (A1). Here, the base station may notify the UE of the maxim AL for the common search space of the common CORESET (e.g., via MIB or synchronization signal). The base station may also notify the UE of a specific AL value or a set of AL values for the common search space of the common CORESET. It may be possible that mapping information of a combination of AL values is preconfigured and, in this case, the base station may transmit an index value indicating the combination of the AL values to the UE. The AL value transmission method may be applied throughout the disclosure. It may be possible that an AL value or a combination of AL values may be determined in the form of a table and, in this case, the base station may transmit to the UE an index value indicating the combination of the AL values, which is retrieved from the table. As described above, the base station may notify the UE of the maximum AL value or a number of AL values to be used. In the case of notifying the UE of the number of AL values to be used, the UE may determine an AL value to be used according to a predetermined rule. For example, the rule may be predetermined such that the AL is determined in an order from the least value.

After being RRC-connected, the UE may decode control information using the AL values in the corresponding CORESET. In this case, the AL value (e.g., 16 or 32) for the UE-specific search space of the common CORESET may be transmitted to the UE via system information or RRC signaling. The transmission may be performed in the same manner as described above.

The UE may be aware of the location of the CORESET A1 based on synchronization information block (SSB) information or relevant information or predetermined location information.

2. Common CORESET Including No UE-Specific Search Space

In an alternative embodiment, a UE attempting to access/attach/camp on to cell 2 may decode common control information with ALs preconfigured as default values before being RRC-connected or ALs up to a maximum AL in the corresponding CORESET (A2). Here, the AL values for the CORESET (A2) may be received in the same manner as described above.

The UE may decode the control information in the CORESET (B1) based on the RMSI identified based on the common control information. In detail, the base station may transmit the AL information via the RMSI, OSI, or RRC signaling in order for the UE to decode the control information based thereon.

In this case, the UE may be aware of the location of each CORESET A2 based on synchronization signal block (SSB) information or relevant information, UE's assumption (spec), etc. The UE may also be aware of the location of a B2 via the information configured in an RRC establishment phase or receipt of a group common PDCCH (L1 signaling). That is, the base station may transmit AL configuration information along with the location of the B1 to the UE in the RRC establishment phase, or it may configure only the location of the B1 (UE-specific configuration of AL for CORESET) in the RRC establishment phase and transmit the AL and CORESET being supported or mapping information to the UE via the RMSI. It may also be possible to further consider a group common PDCCH.

3. Common CORESET Include Part of UE-Specific Search Space

In an alternative embodiment, a UE attempting to access/attach/camp on to cell 3 may decode common control information with ALs preconfigured as default values before being RRC-connected or ALs up to a maximum AL in the corresponding CORESET (A3). Here, the AL values for the CORESET (A2) may be received in the same manner as described above.

The UE may decode the control information in the CORESET (B2) based on the RMSI identified based on the common control information. In a beamforming scenario supporting use of overlapped ALs in the B3, TRPs may each transmit control information through a PDCCH, and the UE may decode control information in multiple CORESETs. In this case, the ALs for the B3 may include some or all of the ALs for the B2 (for USS) and, in addition, the ALs for CSS. In this manner, it may be possible to maintain and support a specific service to some extent in a slot only by performing decoding in the symbol-level CORESET.

In this case, the UE may be aware of the location of each CORESET A3 based on synchronization signal block (SSB) information or relevant information, UE's assumption (spec), etc. The UE may also be aware of the location of the B2/B3 via the information configured in the RRC establishment phase or receipt of a group common PDCCH (L1 signaling).

That is, the base station may transmit AL configuration information along with the location of the B2/B3 to the UE in the RRC establishment phase, or it may configure only the location of the B2/B3 (UE-specific configuration of AL for CORESET) in the RRC establishment phase and transmit the AL and CORESET being supported or mapping information to the UE via the RMSI. It may also be possible to further consider a group common PDCCH.

As described above, the monitoring periodicity may be configured per CORESET. How to configure the monitoring periodicity may vary according to the configurations of the common and UE-specific CORESETs. According to an embodiment, if the common and UE-specific CORESETs are included in one CORESET, the monitoring periodicities for the common and UE-specific CORESETs may be set to p1 in common. If the common and UE-specific CORESETs are configured with separate resources, the monitoring periodicals for the common and UE-specific CORESETs may be set to p1 and p2, respectively. Here, p1 and p2 are set to different values. A detailed description of the configuration method is made hereinafter.

The monitoring periodicity may be configured per PDCCH candidate. According to an embodiment, it may be possible to configure a monitoring periodicity per AL value. Table 2 shows exemplary periodicities configurable per AL of a PDCCH candidate that is actually applied to a cell. However, the A1 values and monitoring periodicities shown in Table 2 are just exemplary, and the scope of the disclosure is not limited thereto. That is, other various combinations of AL values and monitoring periodicities may be used as well as the combinations disclosed in Table 2. In a disclosed embodiment, the base station may configure a monitoring periodicity to the UE using various other methods as well as the method being described with reference to Table 2.

TABLE 2

| Case | Aggregation Level | Monitoring periodicity |
|------|-------------------|------------------------|
| 1 | 8 | 1/2/3 |
| 2 | 4 | 1/2/3 |
| 3 | 1, 2 | 1/2/3/4/8 |
| 4 | 16, 32 | 1/2/3/4/8 |
| 5 | 16, 32 | 1/2/3/4/8 |

In reference to Table 2, in the case where the aggregation level is set to 8, the monitoring periodicity may be set to one of 1, 2, or 3. The aggregation level values and the monitoring periodicities may be mapped in advance such that the UE may identify the monitoring periodicity based on the aggregation level value. However, in the case where multiple monitoring periodicities are mapped, it may be possible for additional information to be transmitted to the UE to indicate which one of the monitoring periodicities is to be used.

The monitoring periodicity may be identified based on SSB information and relevant information or a UE's assumption (spec). The UE may also be aware of the monitoring periodicity via the information configured in an RRC establishment phase or receipt of a group common PDCCH (L1 signaling). According to an alternative embodiment, the monitoring periodicity may be included in the RMSI/OSI. The monitoring periodicity may be configured per candidate aggregation level of a PDCCH in the same manner as the common CORESET configuration method.

However, the monitoring periodicity configuration method is not limited to the disclosed embodiments. That is, the base station may configure the monitoring periodicity regardless of the AL values per CORESET. For example, there may be multiple monitoring periodicities available to be configured, and the base station may select one of the monitoring periodicities per CORESET and notify the UE of the selected monitoring periodicity. For example, the monitoring periodicities available to be configured may be predetermined in a unit of a slot or time, and the base station may configure one of the monitoring periodicities to the UE. It may also be possible that no monitoring periodicity available to be configured is predetermined such that the base station notifies the UE of a length of the monitoring periodicity to be configured using slot-level or time-level bit information. However, the above-described monitoring periodicity configuration method is just an example, and the monitoring periodicity may be configured using various methods.

The proposed method is capable of reducing configuration overhead by configuring the aggregation levels of a CORESET, which is to be configured per UE attempting to access to a cell in the above described manner, in consideration of services and coverage capability being supported by the cell. The proposed method is also capable of reducing a number of PDCCH decoding attempts of the UE by arranging (configuring) suitable ALs according to CORESET resource assignment and further reducing the number of PDCCH decoding attempts by sorting out the monitoring periodicity according to the CORESET or AL.

Figure 7A:
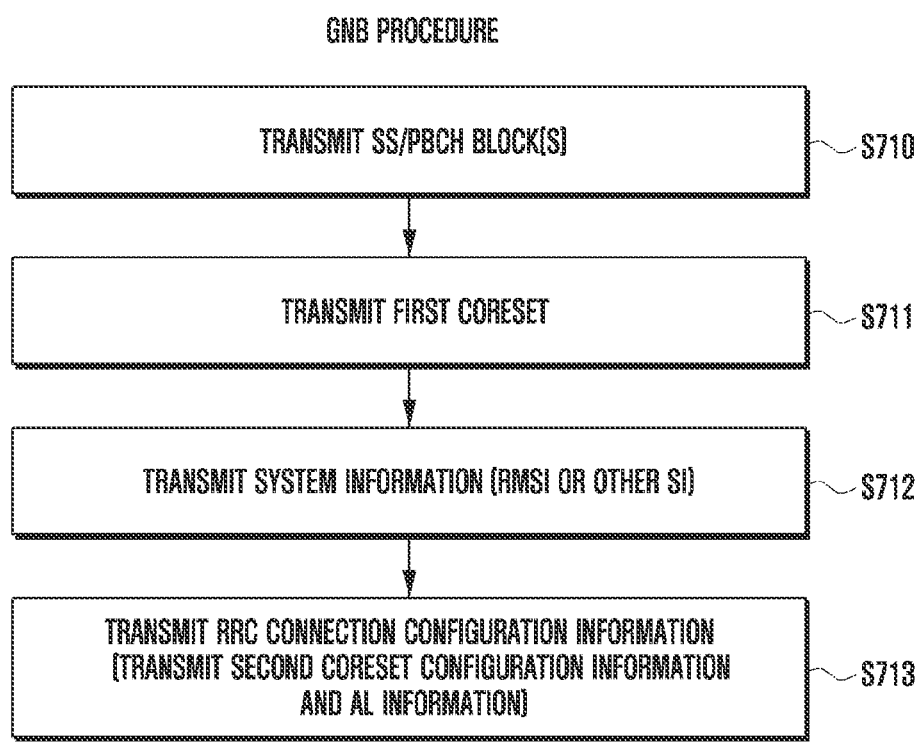
FIG. 7A is a flowchart illustrating a method for a base station to transmit decoding-related information via UE-specific signaling according to a disclosed embodiment.

FIG. 7A is a flowchart illustrating a method for a base station to transmit decoding-related information via UE-specific signaling according to a disclosed embodiment.

In reference to FIG. 7A, the base station may transmit an SS/PCH block at step S710 and transmit a first CORESET at step S711. Here, the first CORESET may be a common CORESET, and transmitting the first CORESET may mean transmitting common control information. The base station may transmit the common control information based on a predetermined default AL value or determine an AL for the first CORESET and transmit the common control information based thereon. The common control information may include information necessary for a UE to receive system information as described above.

At step S712, the base station may transmit the system information. The system information may include information on RMSI and OSI as described above.

At step S713, the base station may transmit RRC connection configuration information to the UE. The RRC connection configuration information may include second CORESET configuration information and AL information.

The second CORESET configuration information may include location and periodicity information of the second CORESET, and the AL information may include information determined per cell. However, the proposed method is not limited to the disclosed embodiment and may be implemented in such a way that the AL information includes information configured per UE. The first and second CORESETs are not limited to being distinguished by time-frequency resources.

The per-cell or per-UE AL information has been described above and thus is not described hereinafter.

The base station may transmit the control information with the AL information in the second CORESET (or UE-specific search space of the first CORESET).

Figure 7B:
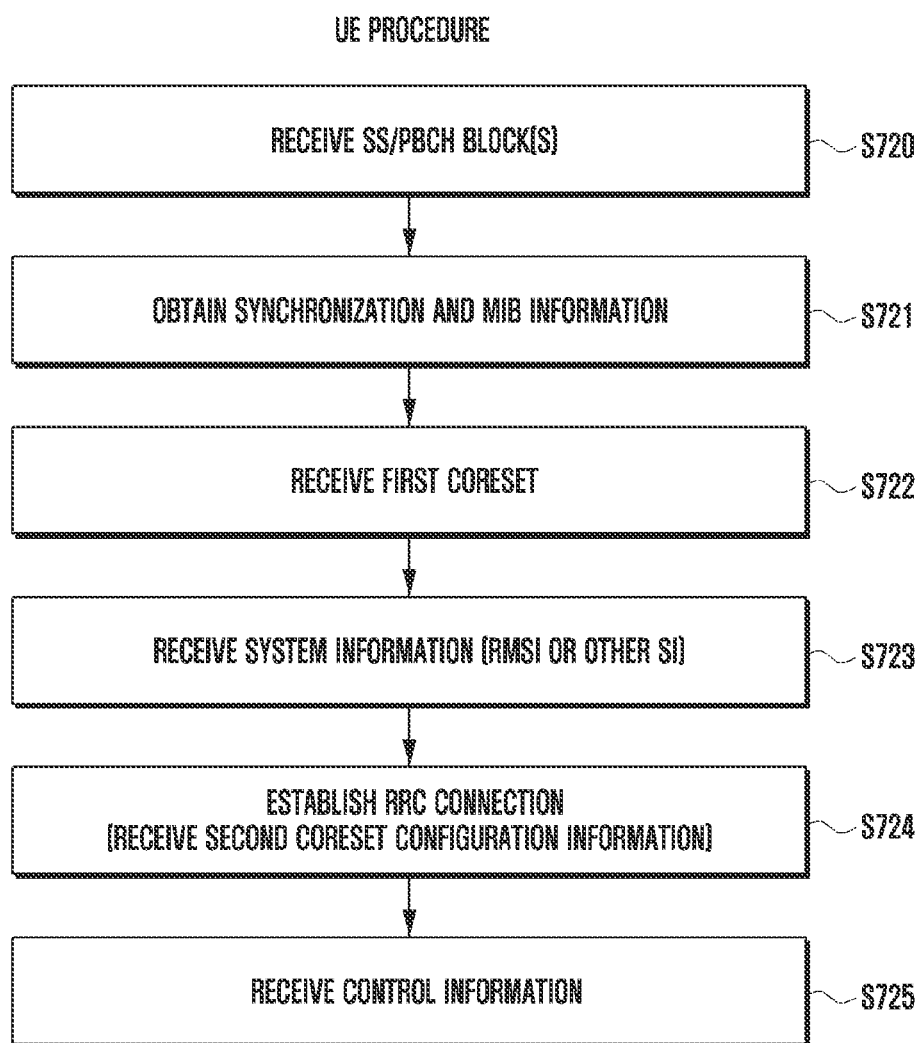
FIG. 7B is a flowchart illustrating a method for a UE to receive decoding-related information via UE-specific signaling according to a disclosed embodiment.

FIG. 7B is a flowchart illustrating a method for a UE to receive decoding-related information via UE-specific signaling according to a disclosed embodiment.

In reference to FIG. 7B, the UE may receive an SS/PBCH block at step S720 and acquire synchronization and MIB information at step S721. At step 722, the UE may receive a first CORESET. The detailed operation is performed in the same manner as at steps S410 to S430 of FIG. 4. Here, the first CORESET may mean a common CORESET, and receiving the first CORESET may mean receiving common control information in the first CORESET. The UE may receive the common control information based on a predetermined default AL value or may receive an SS/PBCH block for the first CORESET and receive the common control information based thereon. The common control information may include information for use by the UE in receiving system information as described above.

At step S723, the UE may receive the system information. The system information may include information on RMSI and OSI as described with reference to step S440 of FIG. 4.

At step S724, the UE may establish an RRC connection. Then, the UE may receive second CORESET configuration information. The UE may also receive AL information. The AL information may mean information for use in decoding control information being transmitted in the second CORESET. However, the proposed method is not limited to the disclosed embodiment and may be implemented in such a way that the AL information includes information for use in decoding control information being transmitted in the common search space of the first CORESET.

The second CORESET configuration information may include location and periodicity information of the second CORESET, and the AL information may include information determined per cell. However, the proposed method is not limited to the disclosed embodiment and may be implemented in such a way that the AL information includes information configured per UE.

The per-cell or per-UE AL information has been described above and thus is not described hereinafter.

Accordingly, the UE may check the RRC configuration for the AL information.

At step S725, the UE may receive control information. In detail, the UE may decode the control information in the second CORESET (or UE-specific search space of the first CORESET) based on the AL information and CORESET configuration information.

The proposed method can be implemented with a different execution order and change in the operations exemplified in FIGS. 7A and 7B. The proposed method can also be implemented with some of the components depicted in the drawings without departing from the technical concept of the disclosure.

Figure 8A:
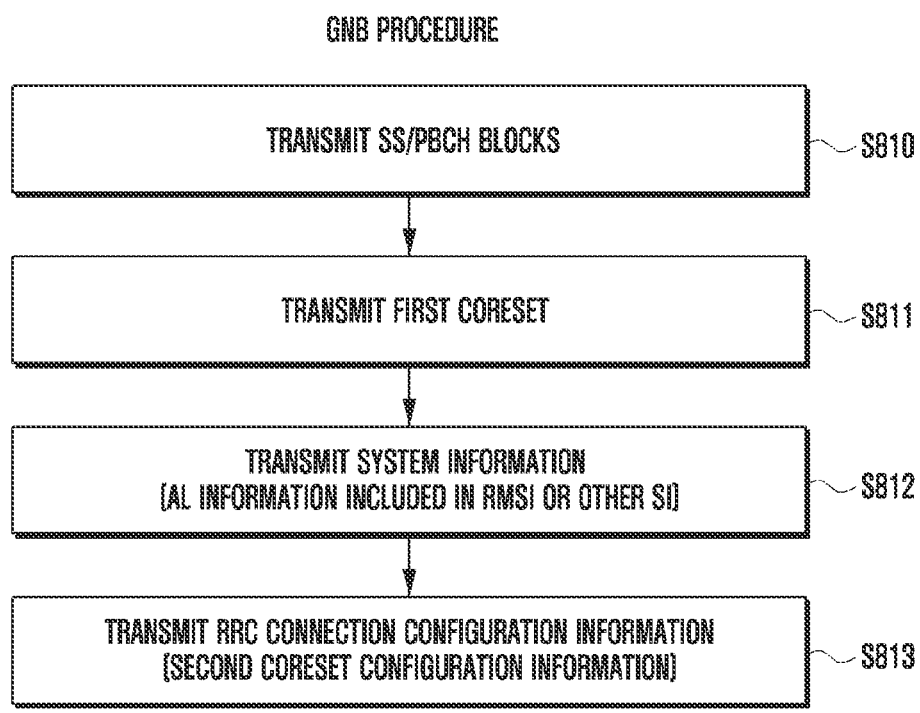
FIG. 8A is a flowchart illustrating a method for a base station to transmit decoding-related information via cell-specific signaling according to a disclosed embodiment.

FIG. 8A is a flowchart illustrating a method for a base station to transmit decoding-related information via cell-specific signaling according to a disclosed embodiment.

In reference to FIG. 8A, the base station may transmit an SS/PBCH block at step S810 and transmit a first CORESET at step S811. The detailed operation is performed in the same manner as described above.

At step S812, the base station may transmit system information. Here, the system information may include AL information. That is, the base station may broadcast the system information include per-cell AL information in order for UEs receive the AL information. The AL information may mean information for use in decoding control information being transmitted in a second CORESET. However, the proposed method is not limited to the disclosed embodiment and may be implemented in such a way that the AL information includes information for use in decoding control information being transmitted in a common search space of the first CORESET.

The AL information may also include information on RMSI or OSI.

The AL information may also include information determined per cell. However, the proposed method is not limited to the disclosed embodiment and may be implemented in such a way that the AL information includes information configured per UE. The per-cell or per-UE AL information has been described above and thus is not described hereinafter.

At step S813, the base station may transmit RRC connection configuration information to the UE. The RRC connection configuration information may include second CORESET configuration information.

The second CORESET configuration information may include location and periodicity information of the second CORESET.

However, the proposed method is not limited to the disclosed embodiment and may be implemented in such a way of transmitting the second CORESET configuration information in the system information.

The base station may transmit the control information with the AL information in the second CORESET (or UE-specific search space of the first CORESET).

Figure 8B:
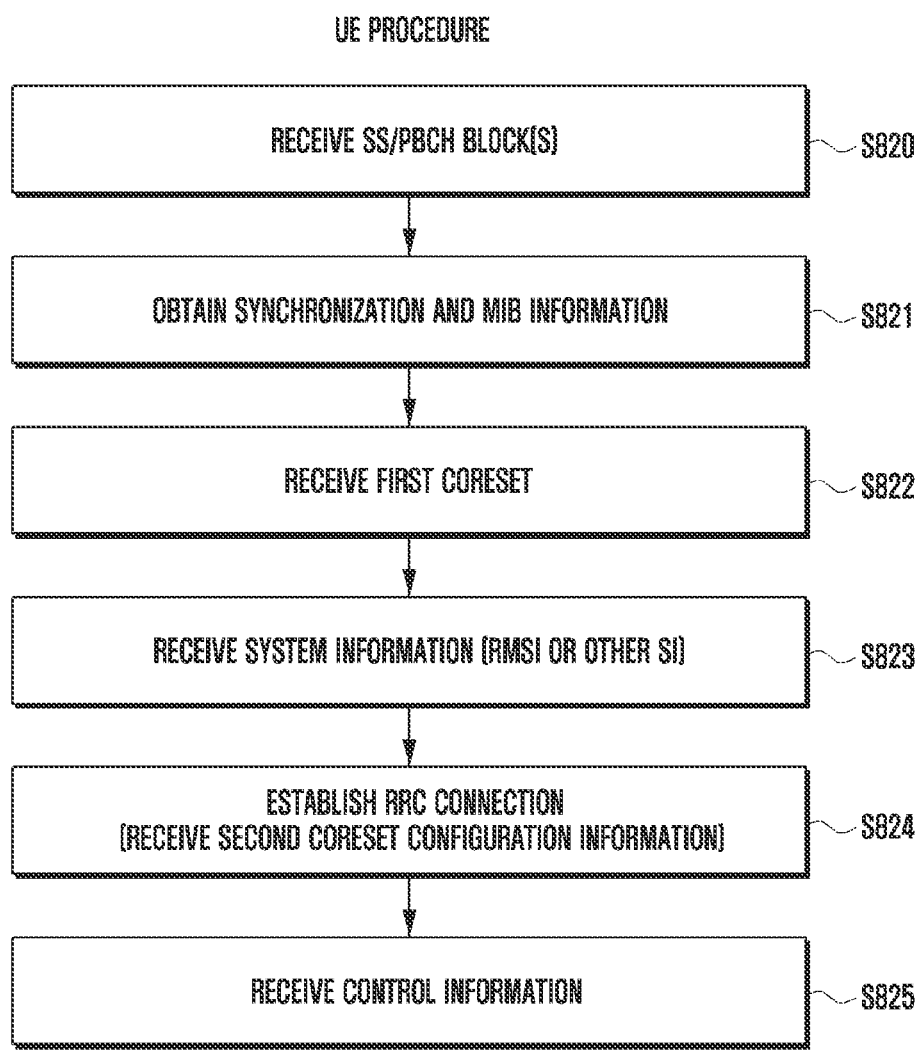
FIG. 8B is a flowchart illustrating a method for a UE to receive decoding-related information via cell-specific signaling according to an embodiment of the disclosure.

FIG. 8B is a flowchart illustrating a method for a UE to receive decoding-related information via cell-specific signaling according to an embodiment of the disclosure.

In reference to FIG. 8B, the UE may receive an SS/PBCH block at step S820 and acquire synchronization and MIB information at step S821. At step S822, the UE may receive a first CORESET. The detailed operation is performed in the same manner as described above.

At step S823, the UE may receive system information. The system information may include AL information as described above.

Accordingly, the UE may acquire the AL information based on the system information.

At step S824, the UE may establish an RRC connection. Then, the UE may receive second CORESET configuration information. The second CORESET configuration information may include location and periodicity information of the second CORESET.

At step S825, the UE may receive control information. The UE may decode the control information in the second CORESET (or UE-specific search space of the first CORESET) based on the AL information and CORESET configuration information.

The proposed method can be implemented with a different execution order and change in the operations exemplified in FIGS. 8A and 8B. The proposed method can also be implemented with some of the components depicted in the drawings without departing from the technical concept of the disclosure. For example, the UE may receive the system information and, after establishing the RRC connection, check for the AL information.

Figure 9:
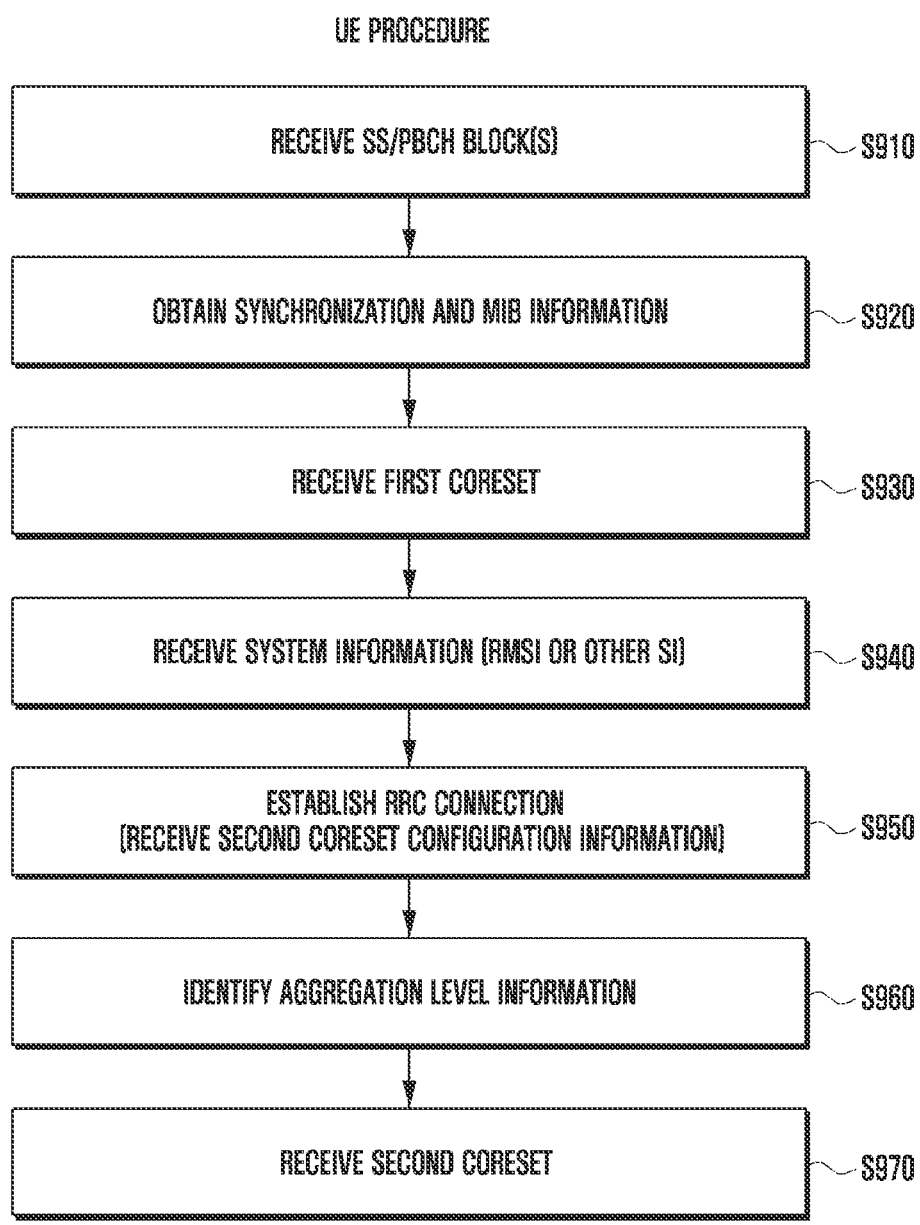
FIG. 9 is a flowchart illustrating a procedure for a UE to receive control information transmitted in CORESETs configured with separate resources according to a disclosed embodiment.

FIG. 9 is a flowchart illustrating a procedure for a UE to receive control information transmitted in CORESETs configured with separate resources according to a disclosed embodiment.

In reference to FIG. 9, the UE may receive an SS/PBCH block at step S910 and acquire synchronization and MIB information at step S920. The UE may receive a first CORESET at step S930. The detailed operation is performed in the same manner as described above.

At step S940, the UE may receive system information. At step S723, the UE may receive system information. The system information may include information on RMSI and OSI as described above.

At step S950, the UE may establish an RRC connection. Then, the UE may receive second CORESET configuration information. The second CORESET configuration information may include location and periodicity information of the second CORESET as described above. The second CORESET configuration information may also be transmitted to the UE via the system information.

At step S960, the UE may check for AL information. The AL information may be information for use in decoding the control signal being transmitted in the second CORESET. However, the proposed method is not limited to the disclosed embodiment and may be implemented in such a way that the AL information includes information for use in decoding the control information being transmitted in a common search space of the first CORESET.

The base station may transmit the AL information to the UE via system information broadcast or RRC configuration information in an RRC connection establishment phase. That is, the UE may acquire the AL information via the system information or RRC configuration information. Here, the AL information may be determined per cell or per UE AS described above.

At step S970, the UE may receive a second CORESET. Receiving the second CORESET may mean receiving the control information being transmitted in the second CORESET. The UE may decode the control information in the second CORESET using the acquired second CORESET configuration information and AL information.

The proposed method can be implemented with a different execution order and change in the operations exemplified in FIGS. 7A and 7B. The proposed method can also be implemented with some of the components depicted in the drawings without departing from the technical concept of the disclosure. For example, the UE may skip the step of checking for the AL information and, if the AL information is received via the system information, may check for the AL information before the RRC connection is established.

The operations described with reference to FIGS. 1 to 9 may be implemented by combining some components without departing from the technical concept of the disclosure.

Figure 10:
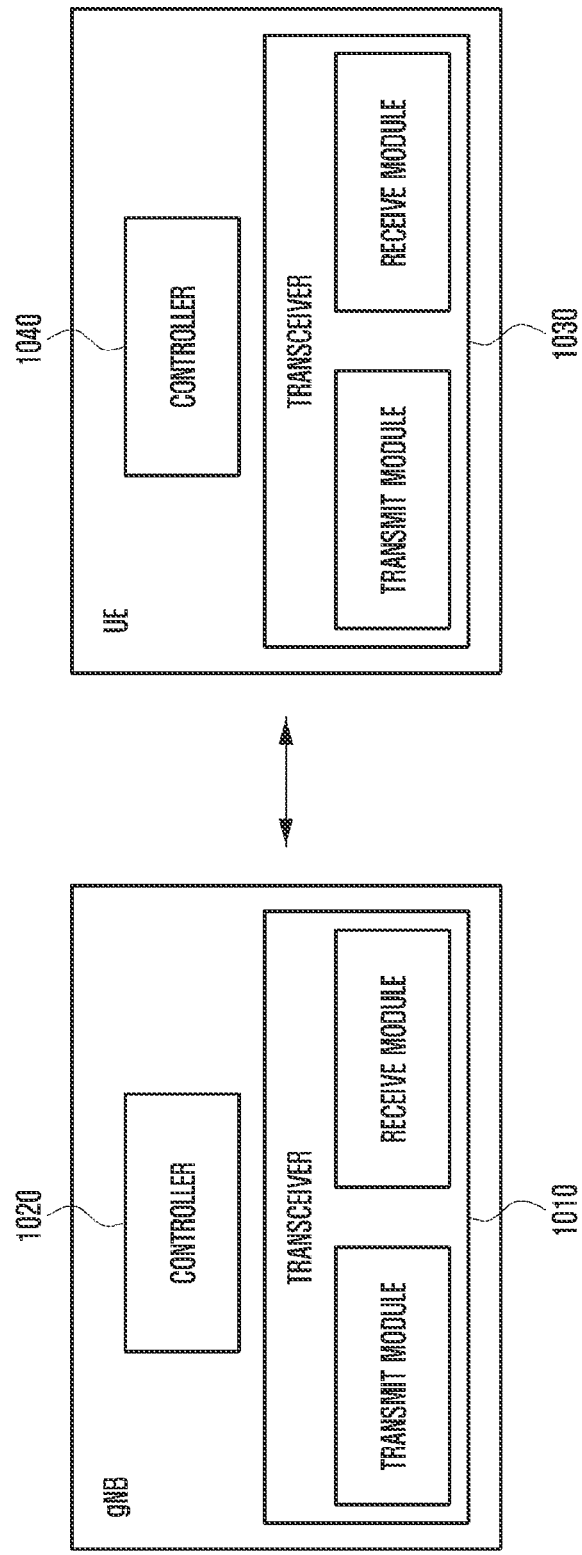
FIG. 10 is a block diagram illustrating configurations of a base station and a UE according to a disclosed embodiment.

FIG. 10 is a block diagram illustrating configurations of a base station and a UE according to a disclosed embodiment.

In reference to FIG. 10, the base station may include a transceiver 1010 and a controller 1020. In a disclosed embodiment, the controller may be defined as a circuit, an application-specific integrated circuit, or at least one processor. The processor may be controlled by a program including instructions for executing the method described in the disclosed embodiment. The program may be stored in a storage medium, which may include a volatile memory or a non-volatile memory. The memory may be a medium that is capable of storing data and, in the case of storing the instructions, may not be limited in type.

The transceiver 1010 may include a transmit module and a receive module and transmit/receive signals. For example, the transceiver 1010 may transmit a synchronization signal block, system information, and control information to the UE.

The controller 1020 may control overall operations of the base station proposed in the disclosed embodiment. The controller 1020 may control signal flows among the components for executing the operations as described with reference to the flowcharts. For example, the controller 1020 may control to transmit decoding-related information for use in decoding the control information to the UE.

According to a disclosed embodiment, the base station may include a storage unit. The storage unit may store at least one of information being transmitted/received by the transceiver 1010 and information generated by the controller 1020.

In reference to FIG. 10, the UE may include a transceiver 1030 and a controller 1040. In a disclosed embodiment, the controller may be defined as a circuit, an application-specific integrated circuit, or at least one processor. The processor may be controlled by a program including instructions for executing the method described in the disclosed embodiment. The program may be stored in a storage medium, which may include a volatile memory or a non-volatile memory. The memory may be a medium that is capable of storing data and, in the case of storing the instructions, may not be limited in type.

The transceiver 1030 may include a transmit module and a receive module and transmit/receive signals. For example, the transceiver 1030 may receive a synchronization signal block, system information, and control information.

The controller 1040 may control overall operations of the UE proposed in the disclosed embodiment. The controller 1040 may control signal flows among the components for executing the operations as described with reference to the flowcharts. For example, the controller 1040 may control to receive decoding-related information for use in decoding control information and decode the control information.

According to a disclosed embodiment, the UE may include a storage unit. The storage unit may store at least one of information being transmitted/received by the transceiver 1030 and information generate by the controller 1040.

The embodiments disclosed in the specification and drawings are proposed to help explain and understand the disclosure rather than to limit the scope of the disclosure. It is therefore intended that the following claims to be interpreted to include all alterations and modifications made to the disclosed embodiments as fall within the sprit and scope of the disclosure.

What is claimed:

1. A method performed by a user equipment (UE) in a communication system, the method comprising:
   receiving, from a base station, a synchronization signal (SS) physical broadcast channel (PBCH) block (SSB);
   obtaining a master information block (MIB) including first configuration information for a first control resource set (CORESET) associated with a common search space (CSS), based on the SSB;
   monitoring first control information for scheduling system information based on a first aggregation level on the CSS;
   receiving the system information based on the first control information;
   establishing a radio resource control (RRC) connection with the base station based on the system information;
   receiving, from the base station, an RRC message including second configuration information for a second CORESET associated with an UE specific search space (USS), based on the RRC connection; and
   monitoring second control information for the UE based on a second aggregation level on the USS,
   wherein the first aggregation level is predetermined and includes one of 4, 8, and 16, and
   wherein the second aggregation level is included in the RRC message and includes one of 1, 2, 4, 8, and 16.

2. The method of claim 1, wherein the SSB comprises at least one of a primary synchronization signal (PSS), a secondary synchronization signal (SSS) or the PBCH.

3. The method of claim 1, wherein the first control information comprises at least one of location information of a resource of the system information or a periodicity information of the system information.

4. The method of claim 1,
   wherein the first aggregation level and the second aggregation level are not overlapped.

5. The method of claim 1,
   wherein the first aggregation level or the second aggregation level is determined based on a type of a service provided by a cell of the base station, or a coverage of the cell.

6. A user equipment (UE) in a communication system, the UE comprising:
   a transceiver; and
   a controller configured to:
      receive, from a base station via the transceiver, a synchronization signal (SS) physical broadcast channel (PBCH) block (SSB),
      obtain a master information block (MIB) including first configuration information for a first control resource set (CORESET) associated with a common search space (CSS), based on the SSB,
      monitor first control information for scheduling system information based on a first aggregation level on the CSS,
      receive, via the transceiver, the system information based on the first control information;
      establish a radio resource control (RRC) connection with the base station based on the system information,
      receive, from the base station via the transceiver, an RRC message including second configuration information for a second CORESET associated with an UE specific search space (USS), based on the RRC connection, and monitor second control information for the UE based on a second aggregation level on the USS, wherein the first aggregation level is predetermined and includes one of 4, 8, and 16, and wherein the second aggregation level is included in the RRC message and includes one of 1, 2, 4, 8, and 16.

7. The UE of claim 6, wherein the SSB comprises at least one of a primary synchronization signal (PSS), a secondary synchronization signal (SSS) or the PBCH.

8. The UE of claim 6, wherein the first control information comprises at least one of location information of a resource of the system information or a periodicity information of the system information.

9. The UE of claim 6,
wherein the first aggregation level and the second aggregation level are not overlapped.

10. The UE of claim 6,
wherein the first aggregation level or the second aggregation level is determined based on a type of a service provided by a cell of the base station, or a coverage of the cell.

* * * * *